United States Patent
Knight et al.

(10) Patent No.: US 11,500,366 B2
(45) Date of Patent: Nov. 15, 2022

(54) METHOD AND SYSTEM FOR FUSING DISPARATE INDUSTRIAL ASSET EVENT INFORMATION

(71) Applicant: GE Aviation Systems Limited, Gloucestershire (GB)

(72) Inventors: Peter R. Knight, Eastleigh (GB); Paul Butterley, Eastleigh (GB)

(73) Assignee: GE Aviation Systems Limited, Gloucestershire (GB)

( * ) Notice: Subject to any disclaimer, the term of this patent is extended or adjusted under 35 U.S.C. 154(b) by 202 days.

(21) Appl. No.: 16/831,715

(22) Filed: Mar. 26, 2020

(65) Prior Publication Data

US 2020/0310402 A1 Oct. 1, 2020

(30) Foreign Application Priority Data

Mar. 26, 2019 (GB) .................................. 1904180

(51) Int. Cl.
*G05B 23/02* (2006.01)
*G06F 16/28* (2019.01)
(Continued)

(52) U.S. Cl.
CPC ....... *G05B 23/027* (2013.01); *G05B 23/0272* (2013.01); *G06F 16/248* (2019.01);
(Continued)

(58) Field of Classification Search
CPC ........... G06F 16/2477; G06F 16/24578; G06F 16/284; G06F 16/248; G05B 23/027; G05B 23/0272; G06Q 10/20
See application file for complete search history.

(56) References Cited

U.S. PATENT DOCUMENTS 7,783,507 B2 8/2010 Schick et al.
9,311,615 B2 4/2016 Davenport et al.
(Continued)

FOREIGN PATENT DOCUMENTS

| AU | 2005200603 B2 | 4/2008 |
| WO | 2017118559 A1 | 7/2017 |
| WO | 2017118670 A2 | 7/2017 |

OTHER PUBLICATIONS

Extended European Search Report from EP Appl. No. 20162010.1, dated May 19, 2020.

*Primary Examiner* — Charles E Anya
(74) *Attorney, Agent, or Firm* — Wood IP LLC

(57) ABSTRACT

There is provided a method and system for monitoring an asset. For example, there is provided a method that includes executing, by a system configured to monitor the asset, a series of operations that can include fetching, from a database communicatively coupled to the system, a data structure including information relative to one or more sources containing event data relative to the asset. The method may include generating, from the data structure, a first table including a list of sources. The method may include generating, from the data structure, a second table including a list of unique consolidated events. The method may include generating, based on a set of predetermined rules, a mapping table configured to relate the first table and the second table. The method may include associating, based on the mapping table, an event in the second table to the one or more sources in the first table.

18 Claims, 3 Drawing Sheets

(51) Int. Cl.
  *G06F 16/2458* (2019.01)
  *G06F 16/2457* (2019.01)
  *G06F 16/248* (2019.01)

(52) U.S. Cl.
  CPC .... *G06F 16/2477* (2019.01); *G06F 16/24578* (2019.01); *G06F 16/284* (2019.01)

(56) References Cited

U.S. PATENT DOCUMENTS

| | | |
|---|---|---|
| 9,552,270 B2 | 1/2017 | Varma et al. |
| 9,552,567 B2 | 1/2017 | Iyer et al. |
| 10,042,915 B2* | 8/2018 | Hanis ................ G06F 16/24575 |
| 10,564,406 B2 | 2/2020 | Namii |
| 2005/0256861 A1* | 11/2005 | Wong ....................... G06F 16/27 |
| 2008/0294771 A1* | 11/2008 | Hermes .............. G05B 23/0267 709/224 |
| 2011/0296256 A1* | 12/2011 | Watkins .............. G06F 11/0724 714/54 |
| 2014/0200952 A1* | 7/2014 | Hampapur ......... G06Q 10/0635 705/7.28 |
| 2016/0078695 A1 | 3/2016 | McClintic et al. |
| 2016/0259842 A1* | 9/2016 | Knight .................. G06F 16/285 |
| 2017/0116054 A1* | 4/2017 | Boddhu ................ G06N 20/00 |
| 2017/0278004 A1 | 9/2017 | McElhinney |
| 2017/0308566 A1* | 10/2017 | Xu ....................... G06F 16/2343 |
| 2018/0218013 A1* | 8/2018 | Busalacchi .......... H04L 43/0876 |
| 2018/0239666 A1* | 8/2018 | Manor ................ G06F 11/0709 |
| 2020/0313953 A1* | 10/2020 | Simeonov ........... H04L 41/0604 |

* cited by examiner

100

200

300

METHOD AND SYSTEM FOR FUSING DISPARATE INDUSTRIAL ASSET EVENT INFORMATION

TECHNICAL FIELD

The present disclosure generally relates to industrial assets. More particularly, the present disclosure relates to a method and a system for fusing disparate industrial asset event information.

BACKGROUND

High value assets such as aircraft, jet engines, wind turbines, trains, ships, etc. are often interfaced with one or more monitoring systems that populate databases with data relative to events occurring during operation and/or during maintenance. An event may be broadly characterized herein as an occurrence in the life cycle of an asset. For example, and without limitation, an occurrence may include maintenance actions (e.g., cleaning, replacing components, etc.) or failure events (e.g., unexpected shut downs, component wear, etc.). Furthermore, an occurrence may include on-board fault messages or monitoring alerts.

Depending on when and where the asset is being monitored, an event may be duplicated across several databases and in different contexts and according diverging data formats. This unwanted redundancy increases risks and maintenance costs, as it can be cumbersome to retrieve and understand event data from a plethora of sources. For example, this unwanted redundancy may cause delays in taking required action when an event is a critical fault.

SUMMARY

The embodiments featured herein help solve or mitigate the above-noted issues as well as other issues known in the art. For example, some of the embodiments featured herein include a system and a method of use thereof that are configured to monitor, fuse and classify asset event data in order to generate actionable information. Each of these kinds of events may be stored in different databases/tables, which each may record the same event but using a different language or in a different format. The embodiments provided herein provide software methods and hardware that are configured to group related events, track useful information, categorize events based on a confidence of the source(s) used, and highlight conflicting information.

For example, in one embodiment, there is provided a method for monitoring an asset. The method includes executing, by a system configured to monitor the asset, a series of operations that can include fetching, from a database communicatively coupled to the system, a data structure including information relative to one or more sources containing event data relative to the asset. The method may include generating, from the data structure, a first table including a list of sources. The method may include generating, from the data structure, a second table including a list of unique consolidated events. The method may include generating, based on a set of predetermined rules, a mapping table configured to relate the first table and the second table. The method may include associating, based on the mapping table, an event in the second table to the one or more sources in the first table.

In yet another embodiment, there is provided a method for monitoring an asset. The method may include executing, by a system configured to monitor the asset, a series of operations that can include fetching, from a database communicatively coupled to the system, a data structure including information relative to one or more sources containing event data relative to the asset. The method may include generating, from the data structure, a first table including a list of sources.

The method may further include generating, from the data structure, a second table including a list of unique consolidated events. The method may include generating, based on a set of predetermined rules, a mapping table configured to relate the first table and the second table. The method may include executing, based on the mapping table, the first table, and the second table, a control subroutine configured to associate a set of events with a corresponding set of sources. The method may further include dynamically categorizing the set of events into known and unknown events.

In yet another embodiment, there is provided a system for monitoring an asset. The system includes a processor and a memory including instructions that, when executed by the processor, cause the processor to perform certain operations that include fetching, from a database communicatively coupled to the system, a data structure including information relative to one or more sources containing event data relative to the asset. The operations may further include generating, from the data structure, a first table including a list of sources.

The operations may include generating, from the data structure, a second table including a list of unique consolidated events. The operations may include generating, based on a set of predetermined rules, a mapping table configured to relate the first table and the second table. The operations may include executing, based on the mapping table, the first table, and the second table, a control subroutine configured to associate a set of events with a corresponding set of sources. The operations may include dynamically categorizing the set of events into known and unknown events.

Additional features, modes of operations, advantages, and other aspects of various embodiments are described below with reference to the accompanying drawings. It is noted that the present disclosure is not limited to the specific embodiments described herein. These embodiments are presented for illustrative purposes only. Additional embodiments, or modifications of the embodiments disclosed, will be readily apparent to persons skilled in the relevant art(s) based on the teachings provided.

BRIEF DESCRIPTION OF THE DRAWINGS

Illustrative embodiments may take form in various components and arrangements of components. Illustrative embodiments are shown in the accompanying drawings, throughout which like reference numerals may indicate corresponding or similar parts in the various drawings.

Furthermore, the drawings are only for purposes of illustrating the embodiments and are not to be construed as limiting the disclosure. Given the following enabling description of the drawings, the novel aspects of the present disclosure should become evident to a person of ordinary skill in the relevant art(s).

DETAILED DESCRIPTION

While the illustrative embodiments are described herein for particular applications, it should be understood that the present disclosure is not limited thereto. Those skilled in the art and with access to the teachings provided herein will recognize additional applications, modifications, and embodiments within the scope thereof and additional fields in which the present disclosure would be of significant utility.

In one embodiment, there is provided a method 100 that may be executed on an application-specific system. The method 100 may include a step 101 that includes creating a source definition table (i.e., a table 102) for tracking one or more sources from which event information related to an asset may originate. For example, and not by limitation, the table 102 may include a database name, a schema name, or a table name where the event data is located. In one implementation where a graphical user interface is available, creating the table 102 may include creating a view, or it may include a SQL select statement.

The table 102 may include one or more fields that include date and time information pertaining to the event and the source from which it originates. Furthermore, the table 102 may also include one or more fields to identify the asset. In a step 103, the method 100 may include creating a table 104 listing all the unique consolidated event names that need to be tracked. In one exemplary implementation, the table 104 may be hierarchical. For instance, for when the asset is a jet engine, the table 104 may include a hierarchical level for a module of the jet engine (e.g., for a fan, a compressor, a combustor, a turbine, an indication, etc.). The table 104 may then further include another hierarchical level that includes information relating to specific faults within that module (e.g. turbine blade faults and/or shroud or nozzle damage).

The method 100 may further have a step 105 that includes creating a mapping table 106 configured to map each source (i.e., entries from the table 102) to unique events in the table 104. In an exemplary implementation, the mapping table 106 may include creating SQL statements for each relevant source and event combination. Further, optionally, each source from the table 102 may be assigned a weight corresponding to a measure of reliability of the source relative to another source or to a predetermined benchmark. Furthermore, optionally, the sources of the table 102 may also be ranked according to the severity of events associated with the sources (e.g., an in-service disruption is more severe than routine maintenance which is more severe than an alert). A control subroutine may be executed to associate a set of events with a corresponding set of sources from a list of sources, based on a mapping table, a first table, and a second table.

Figure 1:
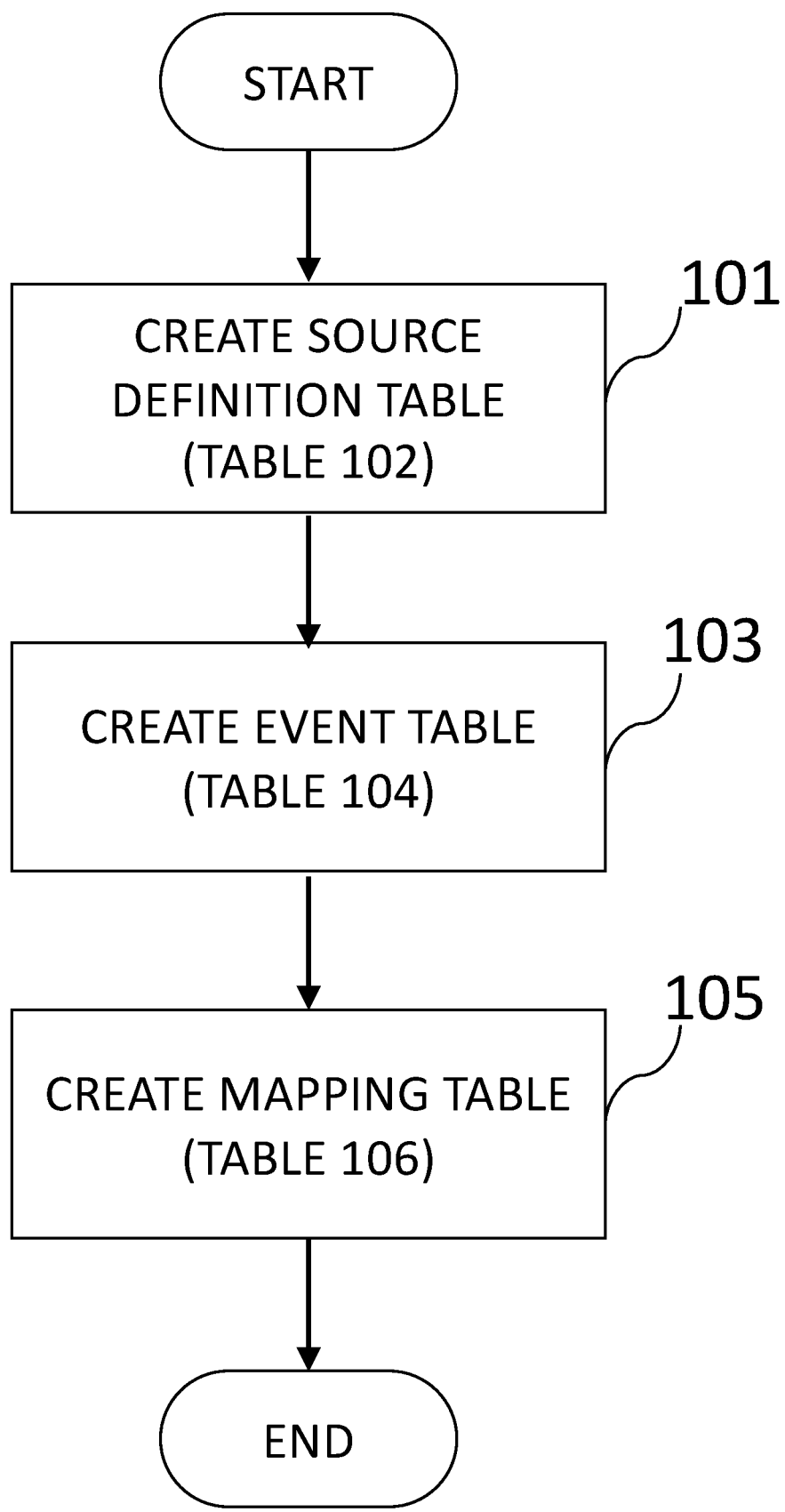
FIG. 1. illustrates a method according to an embodiment.
Figure 2:
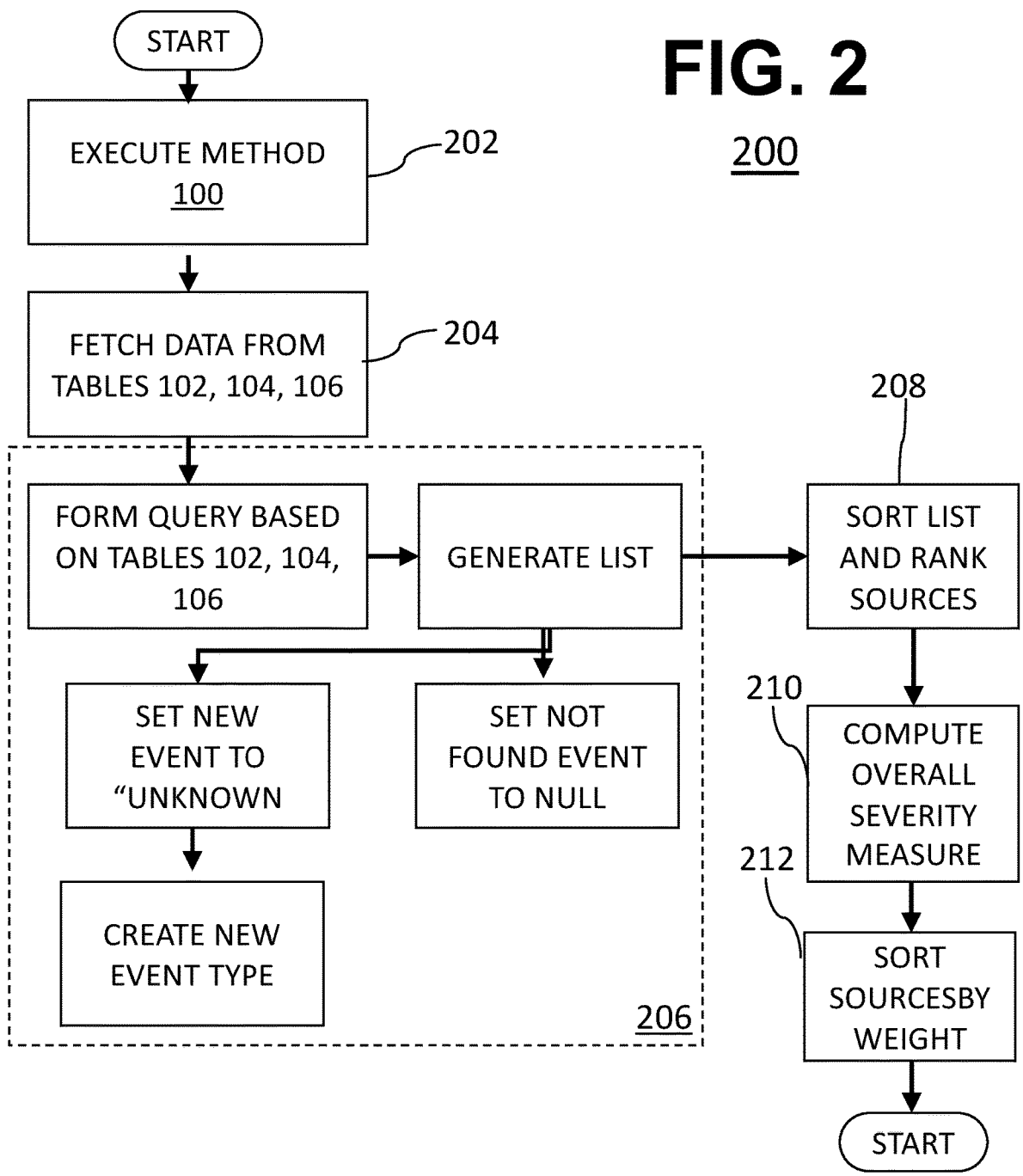
FIG. 2. illustrates another method according to an embodiment.

FIG. 2 illustrates a method 200 that is configured to fuse information from a wide variety of sources to generate actionable information relative to an asset. The method 200 may begin at a step 202 by first executing the method 100, which generates the tables 102, 104, and 106.

Furthermore, the method 200 may include executing a control subroutine (e.g., a loop) at step 204, to fetch all the sources including data relative to an asset defined in the table 102. Next, in a step 206, the method 200 may include using the tables 106 along with the tables 102 and 104 to construct a query that returns a list of event types present in the source tables present in the table 102. When no condition is met (i.e., when no event is found based on the mapping between the tables 104 and 102), the step 206 may include setting an event type to "NULL". Alternately, if an event is found but not listed in the table 104, the event may be marked as "UNKNOWN."

The method 200 may further include a step 208 that includes creating a list of all events and appending all sources together in a predetermined order. For example, and not by limitation, the predetermined order may be that of a list that is sorted chronologically. In an exemplary implementation, the list may be sorted according to an event date (e.g., from first logged event to last logged event) and it may also feature an identifier pertaining to the asset, the event dates, a source, the event types and a description of the events.

The method 200 may further include a step 210 where a loop is conducted over the plurality of assets identified in the previous steps. In one exemplary embodiment, the loop may be conducted twice; in a first pass, the loop may identify unknown event types that are not linked but that are kept for later assessment. In a second pass, the loop may identify the event types that are linked successfully, in which case the weights indicating the severity of each event found may be used to compute an overall severity measure. In the second iteration of the control subroutine or loop, the operations may further include creating a new event type when the first iteration yields an unknown event.

For example, the new overall severity measure may be computed as follows: new_overall_severity= old_overall_severity+new_source_severity*(1−old_overall_severity). The method 200 may then include a step 212 where a loop is conducted over the weights table rows that relate to a particular source, in reverse order of weight magnitude (e.g., with the highest weighted being accessed first).

The method 200 further includes creating an output field indicating the event type from each source being combined. For example, a first event name that is not 'unknown' may be used as an event name for this source. If the event name does not match from different event mappings, the method 200 may include using the first one found (i.e., with the highest confidence) then increment a conflict counter and subsequently reduce the confidence. As such, the exemplary method 200 includes provisions for dynamically providing a confidence measure.

If the group of events is read as "no fault found" (NFF), which is a special case, the method 200 does not use it to create a new event but may use it to reduce the confidence. Furthermore, when the event name is not classified as "UNKNOWN", the method 200 may include searching for matching events that have the same event group and that are within a predetermined time limit (e.g., 30 days).

Furthermore, if the event name is "UNKNOWN" but the loop is on its second pass, then the method 200 includes matching any event within another predetermined time limit that is tighter than the previous predetermined time lit. (e.g., 7 days). If any matches are found, then the method 200 further includes looping over them and updating them accordingly.

Furthermore, if a source is not in the sources list then, the method 200 adds it to the list of sources and increments the confidence. In one exemplary embodiment, this may be achieved as follows: new_overall_confidence=old_ overall_confidence+new_source_confidence*(1−old_overall_confidence). Furthermore, the method 200 can append a description text when the event conflicts or event names don't match. Otherwise, i.e., when no matches found, the method 200 creates a new record. Moreover, the method 200 may be configured to add information about the sources used, such as a query that will bring back all the relevant data from the merged sources. The method 200 may then update a database with the new event list, from which a technician may gather actionable information regarding events originating from disparate sources.

Figure 3:
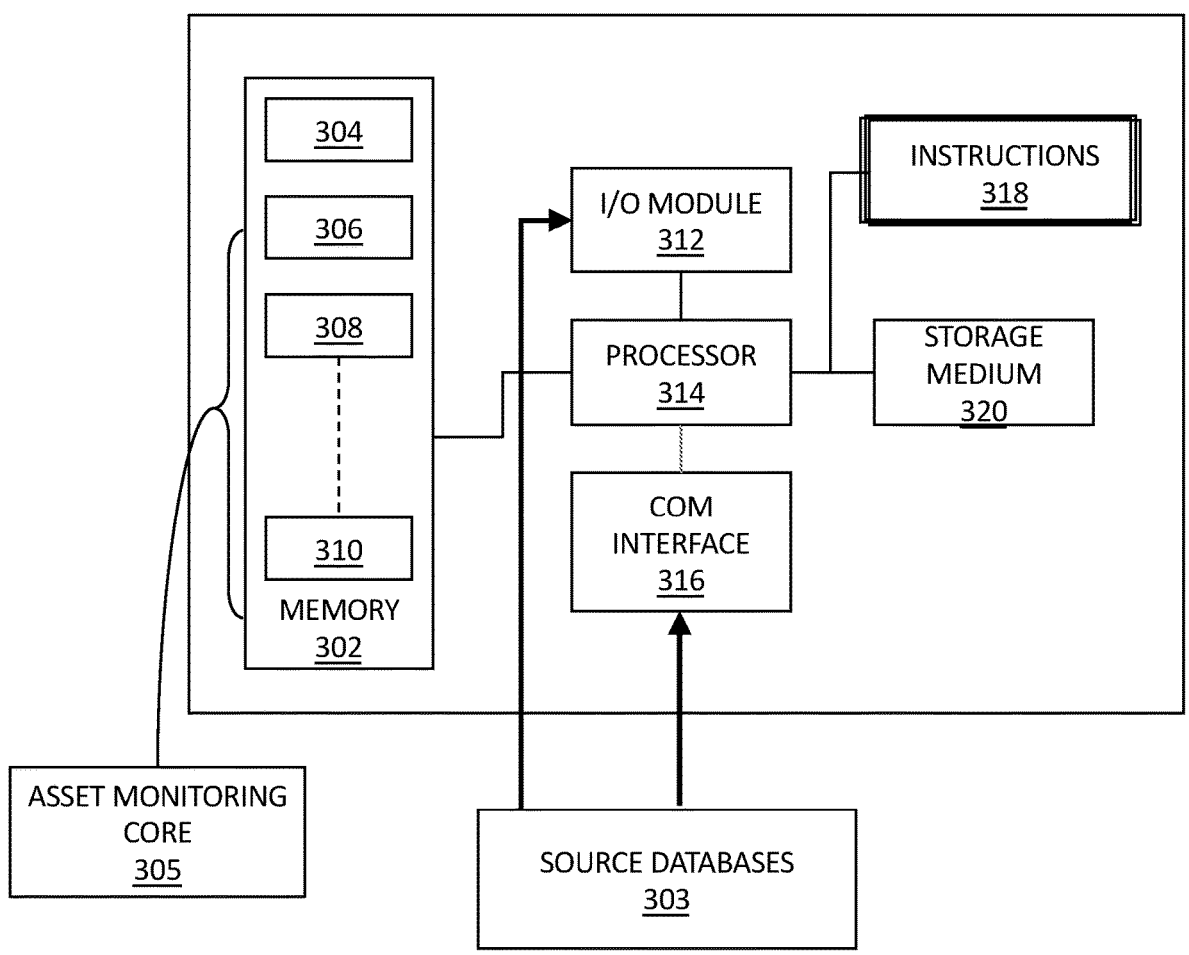
FIG. 3. illustrates a system according to an embodiment.

Having described several exemplary methods and processes, an application-specific system that is configured to undertake these processes is now described. FIG. 3 depicts a system 300 that includes an application-specific processor 314 configured to perform tasks specific to event classification, fusion, and asset monitoring in general.

The processor 314 has a specific structure imparted by instructions stored in a memory 302 and/or by instructions 318 that can be fetched by the processor 314 from a storage medium 320. The storage medium 320 may be co-located with the processor 314, or it may be located elsewhere and be communicatively coupled to the processor 314 via a communication interface 316, for example. Furthermore, in some embodiments, the system 300 may be part of a cloud-based computing infrastructure providing cloud-based computing services.

The system 300 can be a stand-alone programmable system, or it can be a programmable module located in a much larger system. For example, the system 300 be part of a distributed system configured to handle the various modules of the process 100 described above. The processor 314 may include one or more hardware and/or software components configured to fetch, decode, execute, store, analyze, distribute, evaluate, and/or categorize information. Furthermore, the processor 314 can include an input/output module (I/O module 312) that can be configured to ingest data pertaining one or more source databases 108.

The processor 314 may include one or more processing devices or cores (not shown). In some embodiments, the processor 314 may be a plurality of processors, each having either one or more cores. The processor 314 can be configured to execute instructions fetched from the memory 302, i.e. from one of memory block 304, memory block 306, memory block 308, and memory block 310.

Furthermore, without loss of generality, the storage medium 320 and/or the memory 302 may include a volatile or non-volatile, magnetic, semiconductor, tape, optical, removable, non-removable, read-only, random-access, or any type of non-transitory computer-readable computer medium. The storage medium 320 may be configured to log data processed, recorded, or collected during the operation of the processor 314.

The data may be time-stamped, location-stamped, cataloged, indexed, or organized in a variety of ways consistent with data storage practice. The storage medium 320 and/or the memory 302 may include programs and/or other information that may be used by the processor 314 to perform tasks consistent with those described herein. For example, the processor 314 may be configured by instructions from the memory block 306, the memory block 308, and the memory block 310, to perform the methods 100 and 200 described above. The processor 314 may execute the aforementioned instructions from memory blocks, 306, 308, and 310, i.e., an asset monitoring core 305 of the memory 304, to execute a set of operations consistent with the methods 100 and 200.

Those skilled in the relevant art(s) will appreciate that various adaptations and modifications of the embodiments described above can be configured without departing from the scope and spirit of the disclosure. Therefore, it is to be understood that, within the scope of the appended claims, the disclosure may be practiced other than as specifically described herein.

What is claimed is:

1. A method for monitoring an asset, the method comprising:
executing, by a system configured to monitor the asset, a series of operations comprising:
fetching, from a database communicatively coupled to the system, a data structure including information relative to one or more sources containing event data relative to the asset;
generating, from the data structure, a first table including a list of sources comprising the one or more sources;
generating, from the data structure, a second table including a list of unique consolidated event types;
generating, based on a set of predetermined rules, a mapping table configured to relate the first table and the second table; and
associating, based on the mapping table, an event type in the second table to one or more event instances from sources defined in the list of sources of the first table, wherein the associating is done by executing a control subroutine configured to associate a set of events with a corresponding set of sources, and wherein the method further comprises:
dynamically categorizing the set of events into known and unknown events:
creating a new event type during a second iteration of the control subroutine when a first iteration yields an unknown event; and
updating the database with a new event list.

2. The method of claim 1, wherein the second table is hierarchical.

3. The method of claim 1, wherein the first table includes a source name, a schema name, or a table name where the event data are located.

4. The method of claim 3, wherein an entry in the first table includes a SQL select statement.

5. The method of claim 1, wherein the first table includes date and time information pertaining to a specified source of the list of sources.

6. The method of claim 1, wherein the mapping table includes SQL statements.

7. The method of claim 1, wherein the method further includes assigning a weight to each source of the list of sources in the first table.

8. The method of claim 7, wherein each of the weights corresponds to a measure of severity of a specified event associated to a specified source of the list of sources.

9. The method of claim 1, further comprising ranking sources of the list of sources in the first table according to measures of event severity.

10. A method for monitoring an asset, the method comprising:
executing, by a system configured to monitor the asset, a series of operations comprising:
fetching, from a database communicatively coupled to the system, a data structure including information relative to one or more sources containing event data relative to the asset;
generating, from the data structure, a first table including a list of sources comprising the one or more sources;
generating, from the data structure, a second table including a list of unique consolidated event types;
generating, based on a set of predetermined rules, a mapping table configured to relate the first table and the second table; and executing, based on the mapping table, the first table, and the second table, a control subroutine configured to associate a set of events with a corresponding set of sources from the list of sources and wherein the method further comprises:
    dynamically categorizing the set of events into known and unknown events;
    creating a new event type during a second iteration of the control subroutine when a first iteration yields an unknown event; and
    updating the database with a new event list.

11. The method of claim 10, wherein the control subroutine is a loop.

12. The method of claim 10, further comprising an overall severity measure for the set of events.

13. A system for monitoring an asset comprising:
a processor;
a memory including instructions that, when executed by the processor, cause the processor to perform operations including:
    fetching, from a database communicatively coupled to the system, a data structure including information relative to one or more sources containing event data relative to the asset;
    generating, from the data structure, a first table including a list of sources comprising the one or more sources;
    generating, from the data structure, a second table including a list of unique consolidated event types;
    generating, based on a set of predetermined rules, a mapping table configured to relate the first table and the second table; and
    executing, based on the mapping table, the first table, and the second table, a control subroutine configured to associate a set of events with a corresponding set of sources from the list of sources and further comprising:
        dynamically categorizing the set of events into known and unknown events;
        creating a new event type during a second iteration of the control subroutine when a first iteration yields an unknown event; and
        updating the database with a new events list.

14. The system of claim 13, wherein the control subroutine is a loop.

15. The system of claim 13, wherein the operations further include computing an overall severity measure for the set of events.

16. The system of claim 13, wherein the operations further include assigning a weight to each source of the list of sources in the first table.

17. The system of claim 16, wherein each of the weights corresponds to a measure of severity of a specified event associated to a specified source of the list of sources.

18. The system of claim 13, wherein the operations further include ranking sources of the list of sources in the first table according to measures of event severity.

\* \* \* \* \*